(12) United States Patent
Yin et al.

(10) Patent No.: US 10,338,352 B2
(45) Date of Patent: Jul. 2, 2019

(54) WIDE-ANGLE LENS SYSTEM FOR ULTRA-SHORT AND LARGE FIELD-OF-VIEW CAMERA MODULE

(71) Applicant: OmniVision Technologies, Inc., Santa Clara, CA (US)

(72) Inventors: Chuen-Yi Yin, New Taipei (TW); Jau-Jan Deng, Taipei (TW); Ting-Yu Cheng, New Taipei (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 16 days.

(21) Appl. No.: 15/641,498

(22) Filed: Jul. 5, 2017

(65) Prior Publication Data

US 2019/0011677 A1  Jan. 10, 2019

(51) Int. Cl.
*G02B 13/18* (2006.01)
*G02B 9/12* (2006.01)
*G02B 13/00* (2006.01)
*G02B 13/06* (2006.01)
*H04N 5/225* (2006.01)

(52) U.S. Cl.
CPC ..... *G02B 13/0085* (2013.01); *G02B 13/0035* (2013.01); *G02B 13/06* (2013.01); *H04N 5/2254* (2013.01)

(58) Field of Classification Search
CPC .... G02B 3/02; G02B 13/002; G02B 13/0035; G02B 9/12; G02B 13/0025
USPC ................. 359/708, 716, 718, 784
See application file for complete search history.

(56) References Cited

U.S. PATENT DOCUMENTS

| 8,922,913 | B2 | 12/2014 | Yin et al. |
| 9,274,322 | B1 | 3/2016 | Yin et al. |
| 9,451,137 | B2 | 9/2016 | Chen et al. |
| 2009/0046144 | A1* | 2/2009 | Tuttle ................ H01L 27/14627 348/61 |
| 2017/0097497 | A1 | 4/2017 | Cheng et al. |
| 2017/0097499 | A1 | 4/2017 | Cheng et al. |
| 2017/0102526 | A1 | 4/2017 | Chen |
| 2017/0160519 | A1 | 6/2017 | Katsuragi |
| 2018/0052385 | A1* | 2/2018 | Juhola ..................... G02B 7/08 |

\* cited by examiner

*Primary Examiner* — William Choi

(57) ABSTRACT

A wide-angle lens system comprises a first lens having a concave aspheric surface and a planar surface, a second lens having a convex aspheric surface and a planar surface, a substrate, wherein the planar surface of the first lens is adjacent to a first side of the substrate and the planar surface of the second lens is adjacent to a second side of the substrate, a third lens behind the second lens having a concave aspheric surface and a planar surface, and a stop disposed between the first lens and the substrate. The planar surface of the third lens is secured to an outermost surface of an image sensor.

15 Claims, 4 Drawing Sheets

WIDE-ANGLE LENS SYSTEM FOR ULTRA-SHORT AND LARGE FIELD-OF-VIEW CAMERA MODULE

FIELD OF THE INVENTION

This invention relates to a lens system, and more specifically relates to a wide-angle lens system for ultra-short and large field-of-view camera module.

BACKGROUND OF THE INVENTION

With the rapid development of image technology, camera modules are not only employed in consumer electronic devices, such as mobile phones, tablets, and notebooks, but also in machine vision and medical applications such as capsule endoscope. Among others, large field-of-view (FOV) camera modules are especially needed in a variety of applications including machine vision and capsule endoscope.

Machine vision typically requires a large FOV to detect and analyze the environment. A capsule endoscope is a diagnostic instrument in the form of a swallowable optical imaging device. The instrument is sized to be small enough to be swallowed by the patient. The capsule endoscope is typically provided with a wide-angle imaging lens system and an image sensor for receiving raw image data. It is very important that the endoscope be outfitted with high-quality, wide-angle, large-field-of-view optics to increase the possibility of obtaining desirable images.

Most conventional wide-angle lens systems include a number of lenses for incorporating into a lens system. Conventional lens systems typically employ molding glass or plastic lenses. However the cost of molded lenses is relatively high since molded glass or plastic lenses cannot be mass produced. Unlike traditional molded lenses, wafer-level lenses are produced by replicating a number of lenses on a wafer at the same time. Thus, it may lower the cost. Additionally, it can produce a small size wafer-level lens for compact camera module. Accordingly, wide-angle lens systems comprising wafer-level lenses for large FOV compact camera modules are demanded.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
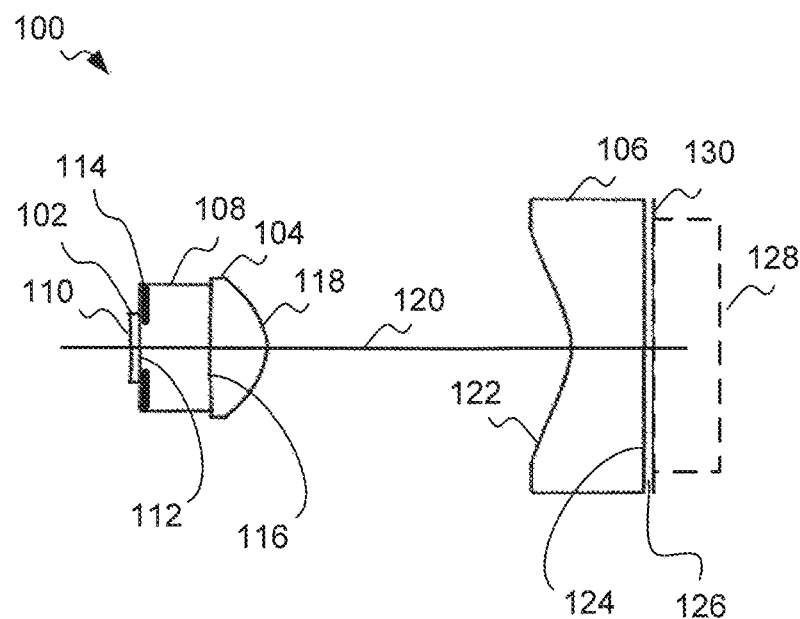
FIG. 1 schematically illustrates a wide-angle lens system for a large FOV camera module, in accordance with an exemplary embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

FIG. 1 schematically illustrates a wide-angle lens system 100 for a large FOV camera module, in accordance with an exemplary embodiment of the present invention. Lens system 100 comprises a first lens 102, a second lens 104, and a third lens 106. First lens 102 is formed on a first side of a substrate 108, second lens 104 is formed on a second side of substrate 108. The first side and the second side of substrate 108 are opposite sides of one another.

First lens 102 has a first aspheric surface 110, which is a first aspheric surface of lens system 100 facing toward an object (not shown), and a second planar surface 112 opposite first aspheric surface 110. Second planar surface 112 is immediately adjacent to a stop 114. Stop 114 is disposed between first lens 102 and substrate 108, and is immediately adjacent to the first side of substrate 108. First aspheric surface 110 of first lens 102 is a concave surface.

Second lens 104 has a first planar surface 116, which is immediately adjacent to the second side of substrate 108, and a second aspheric surface 118 opposite first planar surface 116. Stop 114 and substrate 108 are disposed in the space between first lens 102 and second lens 104. Second aspheric surface 118 of second lens 104 is a convex surface.

Third lens 106 is disposed behind second lens 104. The space immediately between second lens 104 and third lens 106 is air gap. First lens 102, second lens 104, and third lens 106 have a common optical axis 120.

Third lens 106 has a first aspheric surface 122, which is facing second lens 104, and a second planar surface 124 opposite first aspheric surface 122. First aspheric surface 122 of third lens 106 is a concave surface.

A transparent layer 126 is disposed on an image sensor 128. Third lens 106 is disposed on transparent layer 126. Transparent layer 126 may be glue to glue third lens 106 to image sensor 128, in order to secure lens system 100 to image sensor 128. A surface 130 of image sensor 128 may be an image plane of lens system 100. In this embodiment, image sensor 128 has no cover glass. Surface 130 may be a plane of microlens or an outermost surface of image sensor 128. In other words, lens system 100 is secured to the outermost surface of image sensor 128.

First lens 102, second lens 104, and third lens 106 may be wafer-level lenses replicated on wafers. Materials of first lens 102, second lens 104, and third lens 106 may be reflow compatible materials. Materials of first lens 102, second lens 104, and third lens 106 may or may not be different. First lens 102 may be replicated on one side of substrate 108. Second lens 104 may be replicated on another side of substrate 108. Substrate 108 may be a wafer.

Wafer-level lenses 102, 104, and 106 benefit from wafer-level mass production methods to enable lower manufacturing cost than those associated with conventional molded lenses. Furthermore, wafer-level production allows for first lens 102 and second lens 104 to be made from a different material than that of substrate 108. Such additional freedom of material choices, as compared to a molded lens, provides additional flexibility to achieve desired performance characteristics of lens system 100.

Third lens 106 may be replicated on transparent layer 126 on image sensor 128. Third lens 106 may be replicated directly on image sensor 128. Third lens 106 may be replicated on and later removed from a wafer, and glued to image sensor 128 using glue 126. By securing third lens 106 to image sensor 128, it may shorten the height of lens system 100. The distance from the first surface 110 of first lens 102 to surface 130 of image sensor 128 is the height of lens system 100.

First aspheric surface 110 of first lens 102 collects wide angle incident rays and controls the propagation direction of the incident rays in lens system 100. The concave-planar shape of first lens 102 mitigates the angles of the rays entering the system, and directs the rays passing through the aperture of stop 114.

Second aspheric surface 118 of second lens 104 concentrates the rays and directs the rays toward third lens 106. First aspheric surface 122 of third lens 106 balances aberrations generated in first lens 102 and second lens 104 including spherical aberration, field curvature, distortion, and lateral color aberration, and direct the rays to image plane 130.

Stop 114 is disposed between first lens 102 and second lens 104 to limit the periphery incident rays to enter lens system 100, and may reduce the height of lens system 100 providing an ultra-short lens system.

Table 1 illustrates an exemplary data of a first embodiment of wide-angle lens system 100 of a large FOV camera of FIG. 1, in accordance with an exemplary embodiment of the present invention.

TABLE 1

| F/3.6; FOV = 80°; EFFL = 0.687 mm | | | | | |
|---|---|---|---|---|---|
| Lens System | Radius | Thickness | Diameter | Nd | Abbe number |
| OBJ | Infinity | 10.0000 | | | |
| L1R1 | −5.6396 | 0.0234 | 0.2600 | 1.520 | 50 |
| L1R2 | Infinity | 0.0000 | 0.2600 | | |
| STOP | Infinity | 0.0000 | 0.2120 | | |
| Substrate 1 | Infinity | 0.2000 | 0.4600 | 1.517 | 63 |
| L2R1 | Infinity | 0.1582 | 0.5100 | 1.510 | 57 |
| L2R2 | −0.3115 | 0.5791 | 0.5100 | | |
| L3R1 | −0.4450 | 0.2000 | 0.9100 | 1.580 | 31 |
| L3R2 | Infinity | 0.0000 | 1.1000 | | |
| OPTICAL GLUE | Infinity | 0.0050 | 1.1000 | 1.540 | 63 |
| IMA | Infinity | 0.0000 | 1.0600 | | |

| F/3.6: FOV = 80°; EFFL = 0.687 mm | | | | | |
|---|---|---|---|---|---|
| Lens System | Conic | 4 order term | 6 order term | 8 order term | 10 order term |
| OBJ | | | | | |
| L1R1 | 0.0000 | −6.8861 | −44.0350 | 3521.0524 | 0.0000 |
| L1R2 | | | | | |
| STOP | | | | | |
| Substrate 1 | | | | | |
| L2R1 | | | | | |
| L2R2 | −6.6162 | −20.6350 | 222.1428 | −1451.0864 | 0.0000 |
| L3R1 | −0.3856 | 5.1737 | −8.8746 | 19.7820 | 0.0000 |
| L3R2 | | | | | |
| OPTICAL GLUE | | | | | |
| IMA | | | | | |

Table 1 discloses that first lens 102 has a first concave aspheric surface 110 having a radius 5.6396 mm and corresponding aspheric coefficients, and a thickness 0.0234 mm. First lens 102 is made of material having refractive index Nd 1.520 and Abbe number 50. Nd is a refractive index at the Fraunhofer D-line $\lambda=589.3$ nm. Substrate 108 has a thickness 0.2 mm. Substrate 108 is made of material having refractive index Nd 1.517 and Abbe number 63. Stop 114 is disposed between first lens 102 and substrate 108.

Second lens 104 has a second convex aspheric surface 118 having a radius 0.3115 mm and corresponding aspheric coefficients, and a thickness 0.1582 mm. Second lens 104 is made of material having refractive index Nd 1.510 and Abbe number 57. The distance from second aspheric surface 118 of second lens 104 to first aspheric surface 122 of third lens 106 is 0.5791 mm. The space from second aspheric surface 118 of second lens 104 to first aspheric surface 122 of third lens 106 is an air gap.

Third lens has a first concave aspheric surface 122 having a radius 0.4450 mm and corresponding aspheric coefficients, and a thickness 0.2 mm. Third lens 106 is made of material having refractive index Nd 1.580 and Abbe number 31. Transparent layer 126 is made of material having refractive index Nd 1.540 and Abbe number 63. Transparent layer 126 has a thickness 0.005 mm.

Lens system 100 has F-number 3.6, FOV 80 degree, effective focal length EFFL 0.687 mm, and total length TTL, which is the distance from the first aspheric surface of the first lens to the image plane, 1.1657 mm. Lens system 100 forms an image within an area of radius 1.06 mm. Lens system 100 forms an ultra-short camera module, since the image diameter is 1.06 mm and the TTL is 1.1657 mm.

First lens 102 is an object side lens, second lens 104 is an intermediate lens, and third lens 106 is an image sensor side lens.

The designed lens data of Table 1 meets the following four conditions.

$$1.6 < TTL/F < 1.8 \quad \text{Condition} \tag{1}$$

$$1.05 < F/F2 < 1.3 \quad \text{Condition} \tag{2}$$

$$-0.9 < (F1*F2)/[(F1+F2)*F3] < -0.6 \quad \text{Condition} \tag{3}$$

$$A2 > 48, (A2-A3) > 13 \quad \text{Condition} \tag{4}$$

TTL is the total length of the lens system, and F is the effective focal length of the lens system. F1, F2, and F3 are the focal lengths of the first, second, and third second lens, respectively. A2, and A3 are the Abbe numbers of the second lens and the third second lens, respectively.

The first condition is used to limit the total length of the lens system by confining the ratio of total length TTL to effective focal length F of lens system.

The second condition is used to balance aberrations, such as astigmatism and distortion, of the lens system by confining the ratio of effective focal length F of the lens system to focal length of the second lens F2.

The third condition is used to correct aberration such as field curvature of the lens system by confining the relationship among focal length of the first lens F1, focal length of the second lens F2, and focal length of the third lens F3.

The fourth condition is used to correct the chromatic aberrations such as lateral color and axial color. In the lens system, the compensation is determined by higher Abbe number material for the second lens with positive power (convex surface), and lower Abbe number material for the third lens with negative power (concave surface).

Figure 2:
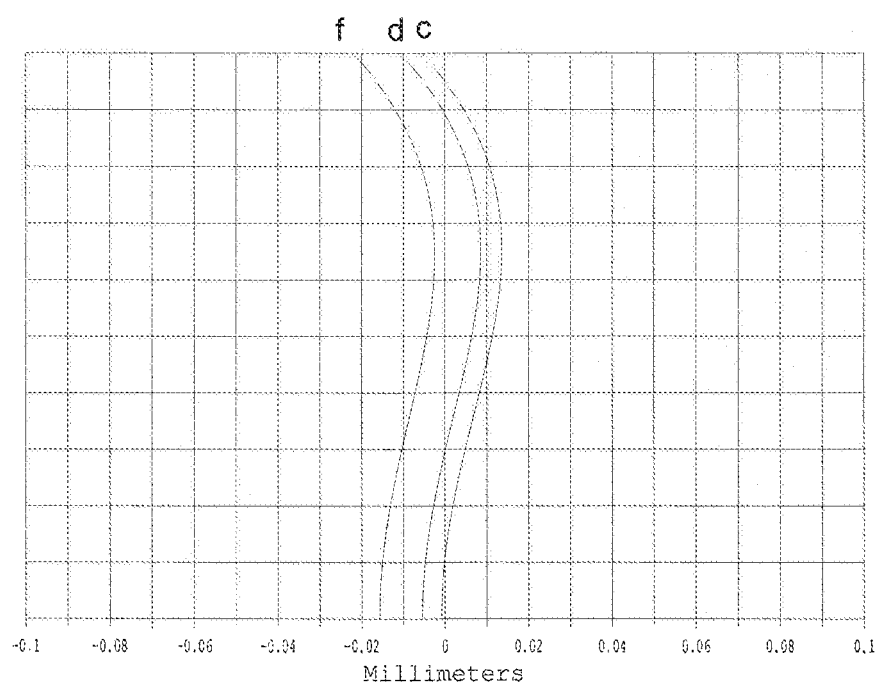
FIG. 2 illustrates curves of spherical aberration of lens system having lens data defined in Table 1, in accordance with an exemplary embodiment of the present invention.
Figure 3:
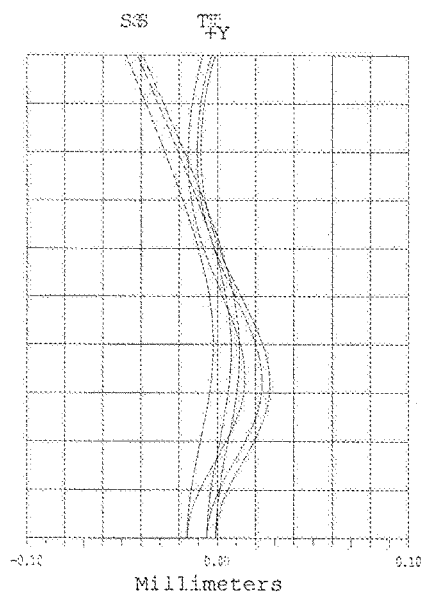
FIG. 3 illustrates curves of field curvature of lens system having lens data defined in Table 1, in accordance with an exemplary embodiment of the present invention.
Figure 4:
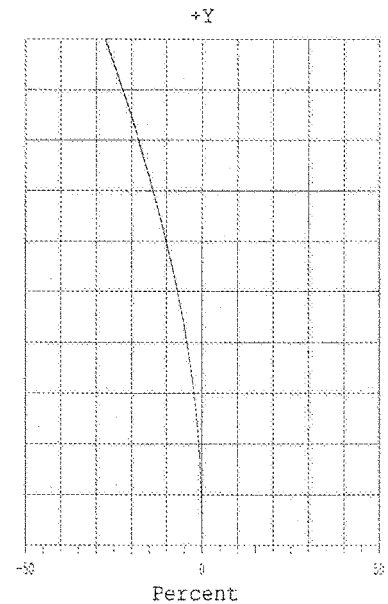
FIG. 4 illustrates a curve of distortion of lens system having lens data defined in Table 1, in accordance with an exemplary embodiment of the present invention.
Figure 5:
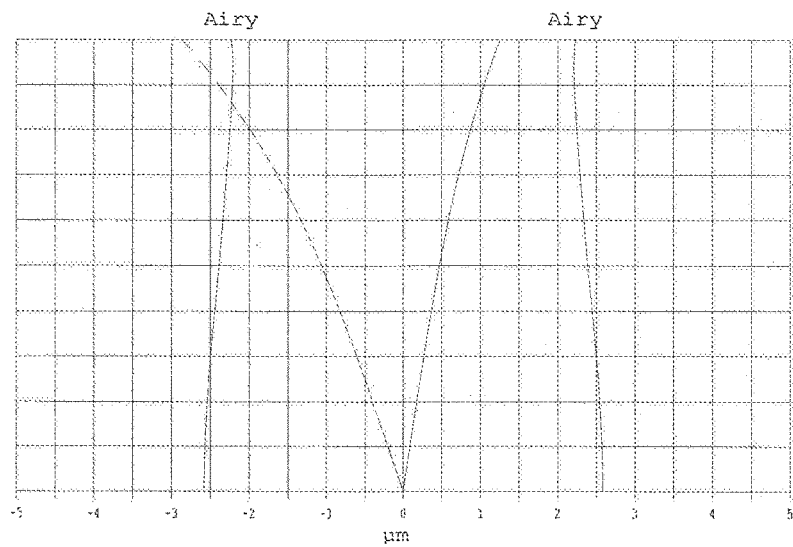
FIG. 5 illustrates curves of lateral color aberration of lens system having lens data defined in Table 1, in accordance with an exemplary embodiment of the present invention.

FIGS. 2, 3, 4 and 5 are curves which illustrate spherical aberration, field curvature, distortion, and lateral color aberration, respectively, for lens system 100 illustrated in FIG. 1, which lens data is defined in Table 1, in accordance with an exemplary embodiment of the present invention. Referring to FIG. 2, the three curves, from left to right, correspond to light with wavelengths of 435.8 nm (f curve), 587.6 nm (d curve), and 656.3 nm (c curve). The spherical aberration is in a possible range which is illustrated to extend from −0.03 mm to 0.02 mm Referring to the diagram of FIG. 3, the field curvature is in a possible range which is illustrated to extend from −0.06 mm to 0.04 mm. Referring to the diagram of FIG. 4, the distortion is in a possible range which is illustrated to extend from −30% to 0%. Referring to the diagram of FIG. 5, the lateral color aberration is limited within an Airy disk from −3.00 μm to 3.00 μm. The aberration values are nominal as understood by those of ordinary skill in the art.

Table 2 illustrates an exemplary data of a second embodiment of wide-angle lens system 100 of a large FOV camera of FIG. 1, in accordance with an exemplary embodiment of the present invention.

TABLE 2

F/4.2; FOV = 100°; EFFL = 0.56 mm

| Lens System | Radius | Thickness | Diameter | Nd | Abbe number |
|---|---|---|---|---|---|
| OBJ | Infinity | 10.0000 | | | |
| L1R1 | −2.1204 | 0.0200 | 0.2000 | 1.510 | 57 |
| L1R2 | Infinity | 0.0000 | 0.2000 | | |
| STOP | Infinity | 0.0000 | 0.1500 | | |
| Substrate 1 | Infinity | 0.1500 | 0.3800 | 1.517 | 63 |
| L2R1 | Infinity | 0.1168 | 0.4100 | 1.510 | 57 |
| L2R2 | −0.2354 | 0.4234 | 0.4100 | | |
| L3R1 | −0.4304 | 0.2500 | 0.8400 | 1.580 | 31 |
| L3R2 | Infinity | 0.0000 | 1.1000 | | |
| OPTICAL GLUE | Infinity | 0.0050 | 1.1000 | 1.540 | 63 |
| IMA | Infinity | 0.0000 | 1.0600 | | |

F/4.2; FOV = 100°; EFFL = 0.56 mm

| Lens System | Conic | 4 order term | 6 order term | 8 order term | 10 order term |
|---|---|---|---|---|---|
| OBJ | | | | | |
| L1R1 | 0.0000 | −31.6338 | 4864.5127 | −369735.6200 | 0.0000 |
| L1R2 | | | | | |
| STOP | | | | | |
| Substrate 1 | | | | | |
| L2R1 | | | | | |
| L2R2 | −7.6276 | −49.0749 | 879.5494 | −9163.6325 | 0.0000 |
| L3R1 | −1.6564 | 2.9186 | 1.2246 | −16.7411 | 0.0000 |
| L3R2 | | | | | |
| OPTICAL GLUE | | | | | |
| IMA | | | | | |

Table 2 discloses that first lens 102 has a first concave aspheric surface 110 having a radius 2.1204 mm and corresponding aspheric coefficients, and a thickness 0.02 mm. First lens 102 is made of material having refractive index Nd 1.510 and Abbe number 57, Substrate 108 has a thickness 0.15 mm. Substrate 108 is made of material having refractive index Nd 1.517 and Abbe number 63. Stop 114 is disposed between first lens 102 and substrate 108.

Second lens 104 has a second convex aspheric surface 118 having a radius 0.2354 mm and corresponding aspheric coefficients, and a thickness 0.1168 mm. Second lens 104 is made of material having refractive index Nd 1.510 and Abbe number 57. The distance from second aspheric surface 118 of second lens 104 to first aspheric surface 122 of third lens 106 is 0.4234 mm. The space from second aspheric surface 118 of second lens 104 to first aspheric surface 122 of third lens 106 is an air gap.

Third lens piece has a first concave aspheric surface 122 having a radius 0.4304 mm and corresponding aspheric coefficients, and a thickness 0.25 mm. Third lens 106 is made of material having refractive index Nd 1.580 and Abbe number 31. Transparent layer 126 is made of material having refractive index Nd 1.540 and Abbe number 63. Transparent layer 126 has a thickness 0.005 mm.

Lens system 100 has F-number 4.2, FOV 100 degree, effective focal length EFFL 0.56 mm, and total length TTL, which is the distance from the first aspheric surface of the first lens to the image plane, 0.9652 mm. Lens system 100 forms an image within an area of radius 1.06 mm.

First lens 102 is an object side lens, second lens 104 is an intermediate lens, and third lens 106 is an image sensor side lens.

The designed lens data of Table 2 also meets the aforementioned four conditions.

$$1.6 < TTL/F < 1.8 \quad \text{Condition} \tag{1}$$

$$1.05 < F/F2 < 1.3 \quad \text{Condition} \tag{2}$$

$$-0.9 < (F1*F2)/[(F1+F2)*F3] < -0.6 \quad \text{Condition} \tag{3}$$

$$A2 > 48, (A2-A3) > 13 \quad \text{Condition} \tag{4}$$

Figure 6:
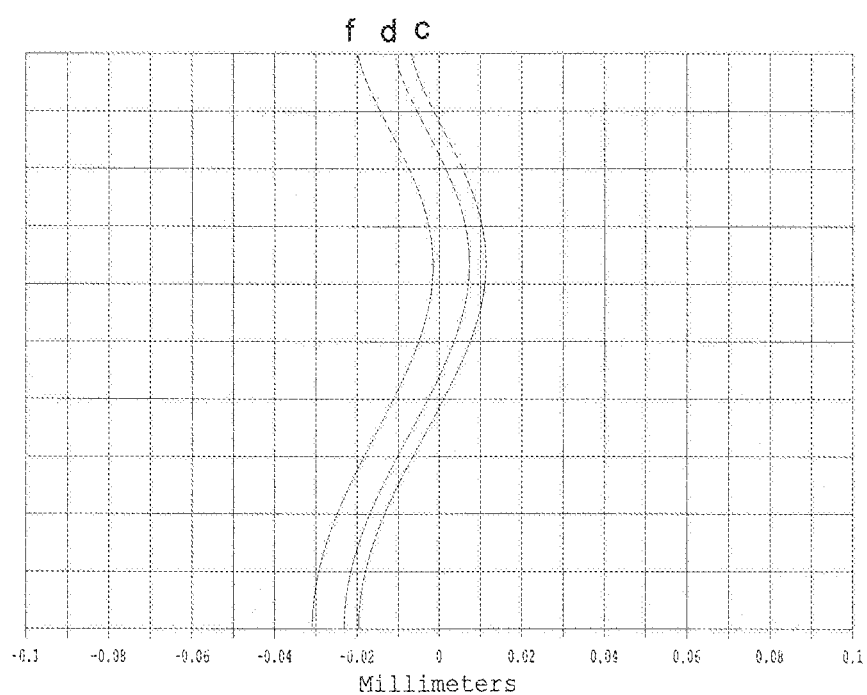
FIG. 6 illustrates curves of spherical aberration of lens system having lens data defined in Table 2, in accordance with an exemplary embodiment of the present invention.
Figure 7:
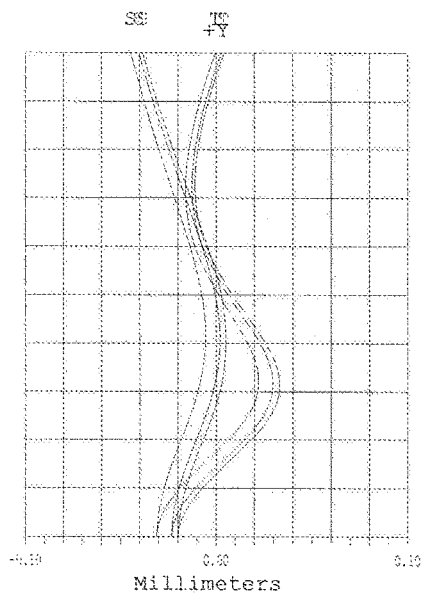
FIG. 7 illustrates curves of field curvature of lens system having lens data defined in Table 2, in accordance with an exemplary embodiment of the present invention.
Figure 8:
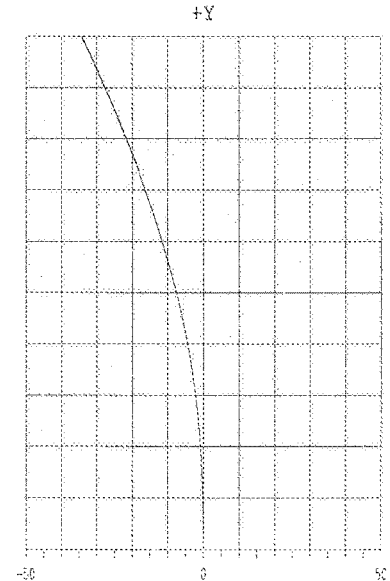
FIG. 8 illustrates a curve of distortion of lens system having lens data defined in Table 2, in accordance with an exemplary embodiment of the present invention.
Figure 9:
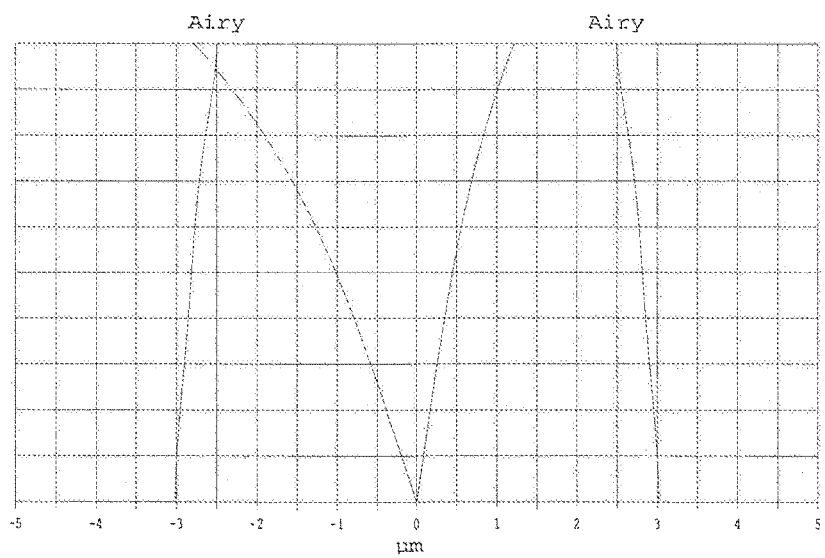
FIG. 9 illustrates curves of lateral color aberration of lens system having lens data defined in Table 2, in accordance with an exemplary embodiment of the present invention.

FIGS. 6, 7, 8 and 9 are curves which illustrate spherical aberration, field curvature, distortion, and lateral color aberration, respectively, for lens system 100 illustrated in FIG. 1, which lens data is defined in Table 2, in accordance with an exemplary embodiment of the present invention. Referring to FIG. 6, the three curves, from left to right, correspond to light with wavelengths of 435.8 nm (f curve), 587.6 nm (d curve), and 656.3 nm (c curve). The spherical aberration is in a possible range which is illustrated to extend from −0.04 mm to 0.02 mm. Referring to the diagram of FIG. 7, the field curvature is in a possible range which is illustrated to extend from −0.06 mm to 0.04 mm. Referring to the diagram of FIG. 8, the distortion is in a possible range which is illustrated to extend from −40% to 0%. Referring to the diagram of FIG. 9, the lateral color aberration is limited within an Airy disk from −3.00 µm to 3.00 µm. The aberration values are nominal as understood by those of ordinary skill in the art.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A wide-angle lens system comprising:
   an image sensor side lens having a first surface and a second surface, wherein the first surface is a concave aspheric surface and the second surface is planar;
   wherein the image sensor side lens is a replicated wafer-level lens;
   wherein the second surface of the image sensor side lens is secured to an outermost surface of an image sensor;
   a transparent layer between the second surface of the image sensor side lens and the outermost surface of the image sensor, wherein the transparent layer is a glue to glue the image sensor side lens to the image sensor;
   an object side lens having a concave aspheric surface and a planar surface;
   an intermediate lens having a convex aspheric surface and a planar surface; and
   a substrate;
   wherein the object side lens is a wafer-level lens replicated on a first side of the substrate, and
   the intermediate lens is a wafer-level lens replicated on a second side of the substrate; and
   wherein the object side lens, the intermediate lens, and the image sensor side lens have a common optical axis.

2. The wide-angle lens system of claim 1, wherein a space between the intermediate lens and the image sensor side lens is an air gap.

3. The wide-angle lens system of claim 1 further comprising:
   a stop disposed between the object side lens and the substrate.

4. The wide-angle lens system of claim 1, wherein the wide-angle lens system satisfies the following conditions:

$$1.6 < TTL/F < 1.8;$$

$$1.05 < F/F2 < 1.3;$$

$$-0.9 < (F1*F2)/[(F1+F2)*F3] < -0.6;$$

$$A2 > 48, (A2-A3) > 13;$$

wherein TTL is a total length of the lens system, F is an effective focal length of the lens system, F1 is a focal length of the object side lens, F2 is a focal length of the intermediate lens, and F3 is a focal length of the image sensor side lens, A2 is an Abbe number of the intermediate lens, and A3 is an Abbe number of the image sensor side lens.

5. The wide-angle lens system of claim 4, wherein the wide-angle lens system has a field-of-view larger than 80 degree.

6. The wide-angle lens system of claim 4, wherein the wide-angle lens system has a total length less than 1.2 mm.

7. The wide-angle lens system of claim 4, wherein the wide-angle lens system forms an image within an area of radius 1.06 mm.

8. A wide-angle lens system comprising:
   a first lens having a concave aspheric surface and a planar surface;
   a second lens having a convex aspheric surface and a planar surface;
   a substrate, wherein the planar surface of the first lens is adjacent to a first side of the substrate and the planar surface of the second lens is adjacent to a second side of the substrate;
   a third lens behind the second lens having a concave aspheric surface and a planar surface;
   wherein the wide-angle lens system satisfies the following conditions:

$$1.6 < TTL/F < 1.8;$$

$$1.05 < F/F2 < 1.3;$$

$$-0.9 < (F1*F2)/[(F1+F2)*F3] < -0.6;$$

$$A2 > 48, (A2-A3) > 13;$$

wherein TTL is a total length of the lens system, F is an effective focal length of the lens system, F1 is a focal length of the first lens, F2 is a focal length of the second lens, and F3 is a focal length of the third lens, A2 is an Abbe number of the second lens, and A3 is an Abbe number of the third lens.

9. The wide-angle lens system of claim 8 further comprising:
   a stop disposed between the first lens and the substrate.

10. The wide-angle lens system of claim 8, wherein a space between the second lens and the third lens is an air gap.

11. The wide-angle lens system of claim 8 further comprising:
    a transparent layer adjacent to the planar surface of the third lens;
    wherein the concave aspheric surface of the third lens is facing the second lens.

12. The wide-angle lens system of claim 11, wherein the transparent layer is a glue to glue the third lens to an image sensor.

13. The wide-angle lens system of claim 8, wherein the wide-angle lens system has a field-of-view larger than 80 degree.

14. The wide-angle lens system of claim 8, wherein the wide-angle lens system has a total length less than 1.2 mm.

15. The wide-angle lens system of claim 8, wherein the wide-angle lens system forms an image within an area of radius 1.06 mm.

\* \* \* \* \*